July 2, 1968 TUNG C. CHEN 3,391,395

COINCIDENT CURRENT MEMORY UTILIZING STORAGE DIODES

Filed April 27, 1964

INVENTOR
TUNG C CHEN

BY J. Donald Weber, Jr.

ATTORNEY 3,391,395

COINCIDENT CURRENT MEMORY UTILIZING STORAGE DIODES

Tung C. Chen, Villanova, Pa., assignor to Sperry Rand Corporation, New York, N.Y., a corporation of Delaware
Filed Apr. 27, 1964, Ser. No. 362,645
4 Claims. (Cl. 340—173)

ABSTRACT OF THE DISCLOSURE

The present circuit provides a plurality of charge-storage diodes which are used as memory elements. The storage diodes are connected to a grid of wires and when there are coincident signals applied to the anode and the cathode of any particular diode that diode stores twice the charge that it would store if only one signal were applied thereto. In addition the circuitry provides a means to detect which if any diodes have stored twice the amount of charge normally stored and hence which diodes are storing data.

This invention relates to a memory device using storage diodes as the memory elements. More particularly, the memory device incorporates storage diodes connected to input lines such that coincident current techniques may be utilized.

Many types of memory devices, especially those using coincident current techniques, have been proposed in the past. These devices utilize various types of components, usually bistable components, connected between input and output lines. These memory devices may be utilized in many applications, as for example in electronic data processing machines and the like.

It is proposed by this invention to utilize storage diodes as the storage element in the memory device. Storage diodes, which are often known as enhancement diodes, snap diodes, or the like, are well known in the art. The operating characteristics of these diodes is also well known. Briefly, the application of a forward bias or conventional current (from anode to cathode) will cause the storage of charge in the lattice structure of the material, e.g., semiconductor material, of the diode. Furthermore, it is well known that, within the limit of the maximum charge storage capability of the diode, the greater the forward current flow therethrough, the greater the amount of charge stored therein. Thus, for example, a forward current of a value $I_F$ stores only approximately one-half the charge in the diode as is stored by a forward current of the value of $2I_F$. The application of a reverse bias or conventional current (cathode to anode) causes the rapid discharge of the charge stored in the storage diode. Thus, if an unlimited magnitude, spike-type, reverse current pulse is applied to the diode, the charge stored therein may be swept therefrom in a very short time. However, if the magnitude of the reverse current pulse is limited by the current source from which it is supplied, the reverse current pulse duration will be a function of the charge stored in the diode. Thus, with proper limitations on the reverse current pulse, the reverse current pulse will have a duration of one unit of time when a forward current $I_F$ has been applied and a duration of approximately twice the initial unit of time when the forward current $2I_F$ is applied. Thus, it will be seen that by properly sampling the condition of the storage diodes, a memory may be provided which utilizes coincident current techniques.

Thus, one object of this invention is to provide a memory device utilizing storage diodes.

Another object of this invention is to provide a memory device utilizing storage diodes in conjunction with coincident current techniques.

Another object of this invention is to provide a coincident current storage diode memory which provides a large output signal and a short cycle time.

Another object of this invention is to provide a memory device wherein information is stored as charge in a storage device and the information is detected as a function of the amount of charge stored in the storage device.

These and other objects and advantages of the instant circuit will become more readily apparent when the following description is read in conjunction with the following drawings, in which.

Figure 1:
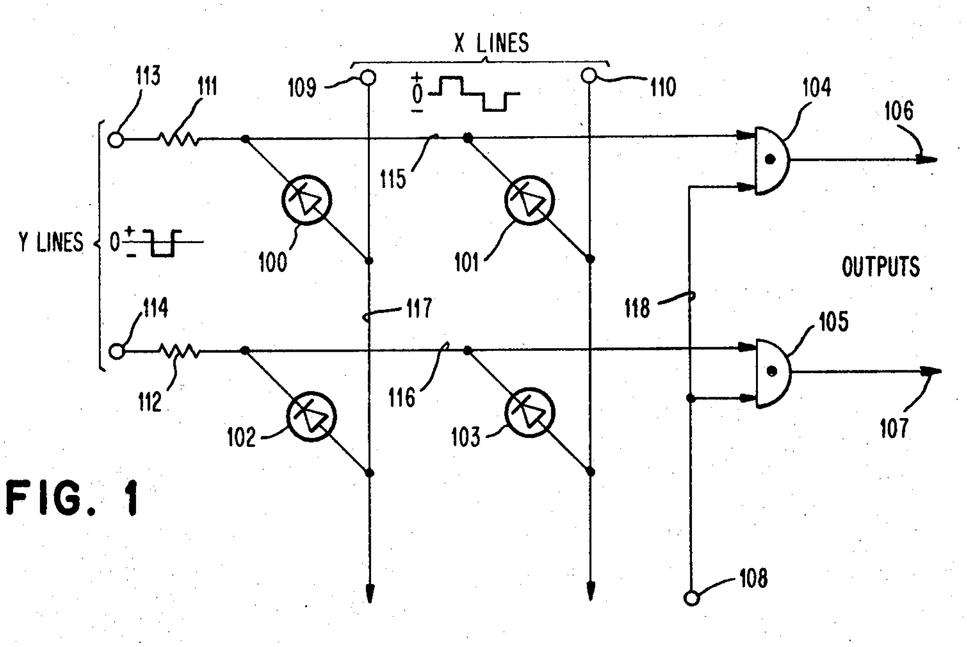
FIGURE 1 is a schematic diagram of a four bit memory device.

Referring now to FIGURE 1, there are shown four storage diodes 100–103. Each of these storage diodes may be similar in construction and have the characteristics suggested supra and described in greater detail in the publication entitled "P-N Junction Charge Storage Diodes," J. L. Moll et al., in Proc. IRE, vol. 50, pp. 43–53, January 1963. The cathodes of the storage diodes are all connected to Y line conductors. The Y line conductors may be considered to be bit lines. In particular, the cathodes of diodes 102 and 103 are each connected to Y line 116. The cathodes of diodes 100 and 101 are connected to Y line 115. Conductor line 116 is connected via resistor 112 to source 114. Conductor line 115 is connected via resistor 111 to source 113. Sources 113 and 114 are any conventional type sources which provide periodic signals which are negative going with respect to ground. In some embodiments, it may be desirable to have the base line of the signal supplied by the source slightly elevated with respect to ground potential while having the actual pulse substantially below ground potential.

At the other end thereof, lines 116 and 115 (and all other Y lines not shown) are connected to NAND gates. Line 116 is connected to one input of gate 105 while line 115 is connected to one input of gate 104. Also connected to one input of each of the gates 104 and 105 (and all other NAND gates not shown) is source 108. Source 108 is any conventional source capable of supplying a negative going pulse at periodic intervals, such that the pulses may be used as clock pulses or strobe pulses. Outputs 106 and 107 are produced by gates 104 and 105 respectively. Gates 104 and 105 may be any typical NAND gates which are designed to produce an output signal in response to two similar types of signals applied to the inputs thereof. In the embodiment shown, the NAND gate is designed to produce a high level output signal in response to the application of two negative or low level input signals thereto. Although not shown, it may be desirable in some cases to insert a diode between the input of the gate and the respective Y line conductor. This diode may be utilized to reduce back coupling as well as spurious outputs due to noise signals and the like. However, this diode is not essential to the operation of the circuit as defined.

Figure 2:
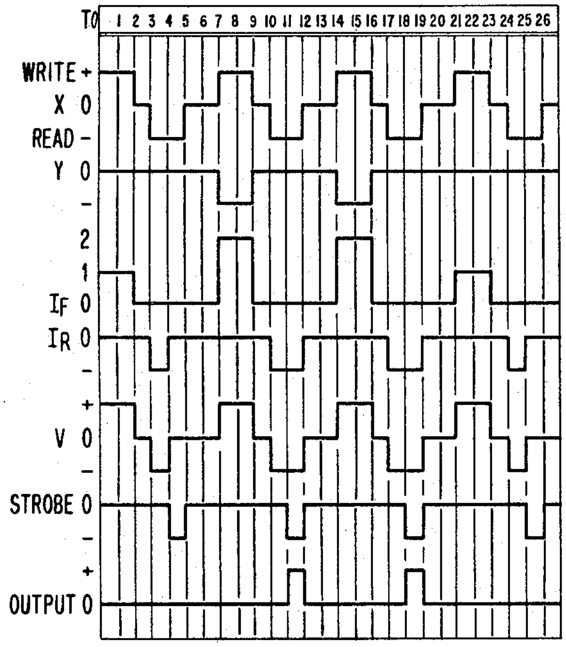
FIGURE 2 is a graphic display of a timing diagram for the circuit shown in FIGURE 1.

The anodes of the diodes 100–103 are each connected to an X line conductor. The X lines may be considered as the word lines of the memory. In particular, diodes 100 and 102 have the anodes thereof connected to X line 117 while diodes 101 and 103 have the anodes thereof connected to X line 118. Lines 117 and 118 are connected to sources 109 and 110, respectively. It is contemplated that sources 109 and 110 may, in actuality, be one and the same source. These sources may be any conventional source capable of supplying periodically occurring positive and negative going signals as shown in FIGURE 2.

It is to be understood of course, that the schematic diagram shown in FIGURE 1, although consisting of only four storage diodes 100–103 is not limited thereto. This invention is meant to include memory devices having numbers of diodes which differ significantly from those shown. Of course, the associated circuitry would be varied accordingly.

The operation of the circuit shown in FIGURE 1 is more readily understandable when described with reference to the timing diagram shown in FIGURE 2. Thus, the signals supplied to the X line conductors by the associated sources are regularly recurring signals which have a positive going or relatively high level, for example +10 volts, WRITE signal portion and a negative going or relatively low level, for example −5 volts, READ signal portion. The READ and WRITE signal portions are separated by a zero portion of the signal, as shown, in order to permit each of the circuit elements to be fully operative during the respective signal portion. However, with components capable of increased speed, this zero portion or cross-over portion may be eliminated and the WRITE and READ signals may be provided by an alternating input signal source. The Y line signals provided by the individual sources 113, 114 or the like are negative going or relatively low level, for example −10 volts, signals which are supplied only when information is to be stored in a storage diode.

Each of the storage diodes is connected identically in the circuit. Therefore, each of the "memory cells" operates identically, and it is necessary to describe the operation of only one of the storage diodes. For convenience, storage diode 100 is chosen. The signal supplied by source 109 to line 117 is a high level signal at time period T0 to T2. Simultaneously, the signal at source 113 is a relatively high level signal, for example ground potential. The relative signal levels are such that the high level signal at source 109 will cause forward current flow through diode 100, and resistor 111 to source 113. This forward current is shown on the line $I_F$ and comprises one unit of forward current. Moreover, inasmuch as diode 100 is substantially a short circuit (or at least a negligible impedance) at this time, the potential on line 115 (designated V) is a high level potential of about +10 volts. The strobe signal is also, relatively, a high signal, e.g. substantially ground potential. Therefore, the output supplied by the NAND gates must be a low level signal inasmuch as two low level input signals are required to produce a high level output signal.

At time period T3 to T5 the signal supplied by source 109 is a low level signal and is applied to the anodes of the storage diode 100. This low level signal is sufficiently large in magnitude that the storage diode (to which the signal is applied) is reverse biased and a reverse current $I_R$ flows therein. Because of the current limiting resistor 111, the reverse current produced by the READ signal supplied by the X source is a substantially rectangular pulse. This pulse has a duration, as shown, extending from T3 to T4. While the reverse current exists in the storage diodes, the storage diodes continue to exhibit a very low impedance. Therefore, the potential V at line 115 assumes the low level potential applied by source 109. Thus, a low level potential is applied to NAND gate 104 via line 115. However, the strobe signal is still a relatively high level (ground) signal at this time whereby the output signal produced by gate 104 remains a low level signal. It will be seen that the strobe signal is applied during time period T4 to T5, subsequent to the expiration of the reverse current signal $I_R$. When the $I_R$ signal has terminated, the impedance of diode 100 is extremely large inasmuch as the diode is now reverse biased. Therefore, the potential at the line 115 assumes a relatively high potential.

At time period T7 to T9, the WRITE signal applied by the X source again becomes a high level signal. Simultaneously, the signal supplied by source 113 to line 115 via resistor 111 becomes a low level signal. The low level signal supplied by source 113 is substantially the mirror image of the high level signal supplied by source 109 whereby the potential difference between source 109 and 113 is effectively twice the amplitude of the signal supplied by either source individually. Thus, a forward current $2I_F$ flows through diode 100 and has an amplitude which is twice the amplitude of the forward current which is produced by the application of the WRITE signal alone. As described supra, this forward current signal stores approximately twice as much current charge in the storage diode. Furthermore, it will be seen that the potential at line 115 and at the input of gate 104 is a relatively high potential. Therefore, the output signal must remain a low level signal.

At time period T10 to T12, the source 109 supplies the low level READ signal while source 113 reverts to the relatively high level signal supplied thereby. The READ signal, as before, is sufficient to reverse bias storage diode 100 and produce a reverse current flow therethrough. However, inasmuch as twice as much charge was stored therein by the large amplitude forward current, the limited reverse current pulse will have a duration which is twice as long as the reverse current pulse produced by the smaller forward current charge storage. Thus, the reverse current produced in response to the READ signal applied at time period T10 to T12 has twice the duration and lasts from T10 until T12. Similarly, the potential V at line 115 assumes a relatively low level for this time also. Therefore, with the application of the negative going or low level strobe signal at time period T11, low level input signals are supplied to both of the inputs of NAND gate 104 during time period T11 to T12. Therefore, a high level output signal is produced by gate 104 between time period T11 to T12.

At time period T14 to T16, the WRITE signal is applied in conjunction with a low level Y signal as was the case at time period T7 to T9. Therefore, the "double" amplitude forward current signal passes through storage diode 100 thereby storing a large amount of charge therein. Consequently, with the application of the low level READ signals by source 109, the elongated reverse current pulse (i.e. the reverse current pulse having twice the duration of a single unit reverse current pulse) is produced. This reverse current pulse again causes the potential V to be a low level signal for a time period of sufficient duration that the strobe pulse supplied at T18 to T19 coincides with a low level potential signal. These two low level signals are applied to the inputs of NAND gate 104 thereby producing a high level output signal at time period T18 to T19.

At time period T21 to T23, the WRITE signal is supplied by the source 109 again. However, at this time no signal is supplied by source 113. Therefore, only a single unit of forward current $I_F$ is supplied. The storage of the single unit of charge, for reasons suggested supra, permits only the one time period reverse current pulse which exists between time periods T24 and T25. Therefore, the potential V at line 115 is a relatively low level potential only during this time. Consequently, the output signal supplied by NAND gate 104 remains a low level signal inasmuch as a high level signal is applied at one input thereof, viz. the strobe signal at time period T24 and the potential V signal at time period T25.

It is to be understood of course, that the circuitry shown is only one embodiment of the invention and the invention is not to be limited to the specific configuration shown. Moreover, the timing diagram is only illustrative of the operation of the circuit and is not meant to suggest any limitations on the circuit operation. Within the scope of the invention, the circuit may be changed to accept different polarity signals and the signals supplied thereto may be altered accordingly.

From the foregoing description, it will be understood that various changes may be made in the form, construction and arrangement of the parts, without departing from the scope of the invention, the form hereinbefore described being merely a preferred embodiment.

The embodiments of the invention in which an exclusive property or privilege is claimed are defined as follows:

1. In combination, a plurality of storage diodes each having a cathode and an anode, said diodes arranged in rows and columns, a plurality of row conductors connected to the anodes of said diodes, a plurality of column conductors connected to the cathodes of said diodes, a plurality of first sources for regularly supplying pulses of alternating polarity to said row conductors, a plurality of second sources for periodically supplying pulses of one polarity to said column conductors, said storage diodes storing one unit of charge therein in response to the application of one polarity signal supplied by the associated source only and storing two units of charge therein in response to the simultaneous application of said one polarity signal from each of said first and second sources, said storage diode providing different duration reverse current pulses in response to the application of the alternate polarity signal by the associated first source in accordance with the storage of one or two units of charge therein, and output means for detecting the duration of said reverse current pulse and producing an output signal only in response to the longer pulse produced due to the storage of two units of charge therein.

2. The combination recited in claim 1 in which said output means comprises gating means and means for supplying regularly recurring pulses.

3. In combination, a plurality of storage diodes each having a cathode and an anode, a plurality of row conductors connected to the anodes of said diodes, a plurality of column conductors connected to the cathodes of said diodes, said diodes arranged in a matrix array having rows and columns, at least one first source for regularly supplying pulses having alternating positive and negative polarity to said row conductors, a plurality of second sources for periodically supplying pulses of negative polarity to said column conductors, each said storage diodes storing one unit of charge therein in response to the application of a positive polarity signal supplied by the associated first source and storing two units of charge therein in response to the simultaneous application of said positive polarity signal from said first source and said negative polarity signal from said second source, each said storage diode providing reverse current pulses in response to the application of said negative polarity signal by said first source, said reverse current pulses having shorter or longer durations in accordance with the storage of one or two units of charge therein respectively, strobe pulse means for supplying a signal immediately after said shorter duration reverse current pulse, and output means connected to said column conductors and said strobe pulse means thereby to produce an output signal only in response to the simultaneous application of said longer pulse produced due to the storage of two units of charge therein and said strobe pulse means signal.

4. The combination recited in claim 3 including current limiting means connected to said column conductors such that the reverse current pulse produced by said negative signal from said first source is a substantially rectangular pulse with a controlled magnitude.

References Cited

UNITED STATES PATENTS

| | | | |
|---|---|---|---|
| 2,825,820 | 3/1958 | Sims | 307—88.5 |
| 2,879,409 | 3/1959 | Holt | 307—88.5 |
| 3,070,779 | 12/1962 | Logue | 340—166 |

BERNARD KONICK, *Primary Examiner.*

J. F. BREIMAYER, *Assistant Examiner.*